United States Patent
Wilson

[19]

[11] Patent Number: 6,116,285
[45] Date of Patent: Sep. 12, 2000

[54] REMOVABLE THREADED PLUG

[75] Inventor: Buddy Allen Wilson, Sapulpa, Okla.

[73] Assignee: TDW Delaware, Inc., Wilmington, Del.

[21] Appl. No.: 09/111,219

[22] Filed: Jul. 7, 1998

[51] Int. Cl.$^7$ .................................................. F16L 55/10
[52] U.S. Cl. .............................. 138/89; 138/96 T; 138/92; 220/284; 220/288
[58] Field of Search ...................... 138/89, 92, 94, 138/96 T; 220/288, 284

[56] References Cited

U.S. PATENT DOCUMENTS

| | | | |
|---|---|---|---|
| 2,483,964 | 10/1949 | Bennett | 138/89 X |
| 2,675,142 | 4/1954 | Spayd | 138/89 X |
| 3,155,116 | 11/1964 | VerNooy | 138/89 |
| 3,157,203 | 11/1964 | Ver Nooy | 138/89 |
| 3,766,947 | 10/1973 | Osburn | 138/89 |
| 3,870,084 | 3/1975 | Gezari | 138/89 |
| 3,893,487 | 7/1975 | Engelking | 138/89 |
| 3,993,102 | 11/1976 | Polster et al. | 138/89 |
| 4,019,541 | 4/1977 | Koppl | 139/94 |
| 4,058,142 | 11/1977 | Rankin | 138/89 |
| 4,127,141 | 11/1978 | Ledonne et al. | 137/15 |
| 4,393,900 | 7/1983 | Gajajiva et al. | 138/89 |
| 4,466,550 | 8/1984 | Sullivan | 220/206 |
| 4,620,330 | 11/1986 | Izzi, Sr. | 138/89 X |
| 4,693,278 | 9/1987 | Wilson et al. | 138/89 |
| 4,712,586 | 12/1987 | McCauley et al. | 138/89 |
| 4,823,411 | 4/1989 | Nettel | 138/89 X |
| 4,948,550 | 8/1990 | Worthy | 138/89 X |
| 5,560,388 | 10/1996 | Caldwell | 137/15 |
| 5,577,776 | 11/1996 | Welch | 285/55 |
| 5,592,965 | 1/1997 | Rakieski | 137/315 |
| 5,676,174 | 10/1997 | Berneski, Jr. | 138/89 |
| 5,701,935 | 12/1997 | Vasudeva | 138/89 |

*Primary Examiner*—Patrick Brinson
*Attorney, Agent, or Firm*—Head, Johnson & Kachigian

[57] ABSTRACT

A removable plug for an internally threaded opening has particular application in a system for closing an opening in the sidewall of a pipe. The system includes a nipple having an inner end attached, such as by welding, to a pipe, and an outer end having internal threads. A short length externally threaded cylindrical plug body is threadably positionable within the nipple outer end, the plug body having a recess in a top surface thereof. An insert is affixed within the plug body recess providing an operating space within the recess below the insert, the insert being formed of a metal plate having a tool receiving central opening therethrough and at least one integral tang portion extending downwardly into the plug body operating space, the insert being secured, such as by welding to the plug body. The insert central opening is shaped in a geometrical pattern, such as a square, to slidably and non-rotatably receive a plug engaging portion of a driver of matching cross-sectional configuration.

20 Claims, 3 Drawing Sheets

REMOVABLE THREADED PLUG

REFERENCE TO PENDING APPLICATIONS

This application is not related to any pending applications.

REFERENCE TO MICROFICHE APPENDIX

This application is not referenced in any microfiche appendix.

BACKGROUND OF THE INVENTION

In fluid handling, whether liquid or gas, it is frequently necessary to attach a branch fitting to a pipe sidewall. When the fitting is attached to a pipe under pressure systems are available for securing a short length branch fitting, such as a nipple, to the pipe after which an opening is drilled within the nipple through the pipe sidewall. In instances where the pipe is not under pressure an opening can be first drilled through the pipe sidewall and the inner end of a short length nipple can then be welded to the pipe. If the purpose for attaching the short length nipple is temporary, that is, where it is not attached for continuous and permanent use for the passage of liquid or gas therethrough, it is frequently necessary to close the outer end of the nipple in a way so that it can be easily reopened. For this purpose, a plug is used.

A plug used to close the outer end of a tubular member can be of two basic types, that is, a threaded plug or a non-threaded plug. The use of non-threaded plugs to close the outer end of a pipe are illustrated in previously issued U.S. Pat. Nos. 4,693,278; 4,466,550; 4,058,142; 3,766,947 and 3,155,116. These non-threaded closures typically include a mechanism by which a portion of the closure can be radially outwardly extended into an internal circumferential groove in a tubular member. These type of closures are relatively expensive to manufacture and are used in special applications. The present invention is concerned with a different type of closure member or plug as it is commonly called, that is, the present invention is concerned with a removable externally threaded plug designed to threadably fit into an internally threaded member, such as an internally threaded nipple.

The use of threaded plugs is illustrated in U.S. Pat. No. 5,577,776 entitled "T-Fitting For Lined Pipes", issued Nov. 26, 1996. A further example of the use of a threaded plug is illustrated in FIG. 21 of U.S. Pat. No. 5,560,388 that issued on Oct. 1, 1996, entitled "Seal Plug For Lined Pipelines".

The threaded plugs used to close the interior of a tubular member as illustrated in Pat. Nos. 5,577,776 and 5,560,388 are usually manually inserted into an internally threaded tubular member and then a wrench is inserted into a recess in the upper end of the plug so that the plug can be threadably rotated into sealed position. The present invention is concerned with a plug that is particularly adaptable for insertion into or removal from tubular member by use of a tool, that is, where the plug is secured to the outer end of a specially designed tool by which it is inserted into a tubular member or removed from a tubular member rather than being initially threaded by hand or removed by hand as is the case with the type of threaded plug shown in U.S. Pat. Nos. 5,577,776 and 5,560,388.

It is therefore an objective of this invention to provide a system for closing an opening in the sidewall of a pipe and particularly for a removable plug for an internal threaded opening, such as an internally threaded nipple, the plug being particularly adaptable for insertion or removal by attachment to the outer end of a tool.

BRIEF SUMMARY OF THE INVENTION

A system for closing an opening in a sidewall of a pipe is provided. The system includes three basic elements, that is, a nipple that is attachable to the sidewall of a pipe in communication with an opening therein, a removable plug that can be threadably inserted into and removed from the interior of a nipple and a driver for threading and unthreading the plug. The plug itself is formed of two basic components, that is, a plug body and an insert, the insert being secured to the plug body such as by welding. An elastomeric seal is an additional element of the system.

The nipple used in the system has an inner end and an outer end, the inner end being configured to be attached to a pipe sidewall to encompass an opening in the pipe. Attachment can be by a variety of means but typically the inner end of the nipple can be welded to a pipe.

The plug body is in the form of a short length cylindrical member having a threaded cylindrical external surface. The plug body has a recess in the top surface.

An insert is positioned within the recess in the plug body. The insert is configured to provide an operating space within the plug body recess below the insert. The insert has a generally planar upper surface having a geometrically configured (such as square) tool receiving central opening therethrough. The insert may include at least one integral tang portion extending downwardly into the operating space. The insert is secured to the plug body such as by welding.

In a preferred method of manufacturing the plug, the insert is formed of a sheet of steel. A cylindrical blank is cut from the sheet of steel, the blank having an external circumferential surface dimensioned to be received in the recess in the plug body. A shaped tool receiving opening is formed through the insert plate. The opening is shaped in a way so that it can be engaged by a driver tool to rotate the plug. The insert may also be shaped to provide at least one, and preferably two tang portions. The tang portions are bent downwardly to extend at an angle of about 90° relative to the top surface of the insert so that when the insert is positioned within a plug body and welded in position the integral tang portions extend into the operating space below the insert.

The opening through the insert, in a preferred arrangement of the insert, provides not only for a driver engaging opening and integral tang portions that are subsequently bent at right angles to the insert, but also opposed radial notches. These radial notches are configured to receive a pin that extends through a cylindrical plug removal tool by which the plug is inserted into or removed from an internally threaded nipple.

The plug has on its exterior surface a circumferential recess that receives an elastomeric gasket, such as an O-ring. In a preferred design of the nipple an internal cylindrical surface is provided between the internal threads and the nipple outer end. The elastomeric member or O-ring, engages this cylindrical surface to form a sealed relationship between the exterior of the plug body and the interior of the nipple.

In addition to the internal threads, the nipple preferably has external threads adjacent the outer end that can receive a cap to provide further assurance that no leakage can occur through the nipple after the plug is installed and to protect the plug so that it may be more easily extracted if necessary.

An improved driver for use with the threaded plug is in the form of a cylindrical member having a radially extending pin at one end by which it can be attached to an operating tool and has, at the opposite end, a plug engaging portion with an external shape to be inserted into the tool receiving opening in the insert plate. Preferably, the tool receiving opening in the insert plate has sides forming a square and the driver plug engaging portion is square in cross-section.

A better understanding of the invention will be obtained from the following description of the preferred embodiments and claims, taken in conjunction with the attached drawings.

DETAILED DESCRIPTION OF THE PREFERRED EMBODIMENTS

Figure 1:
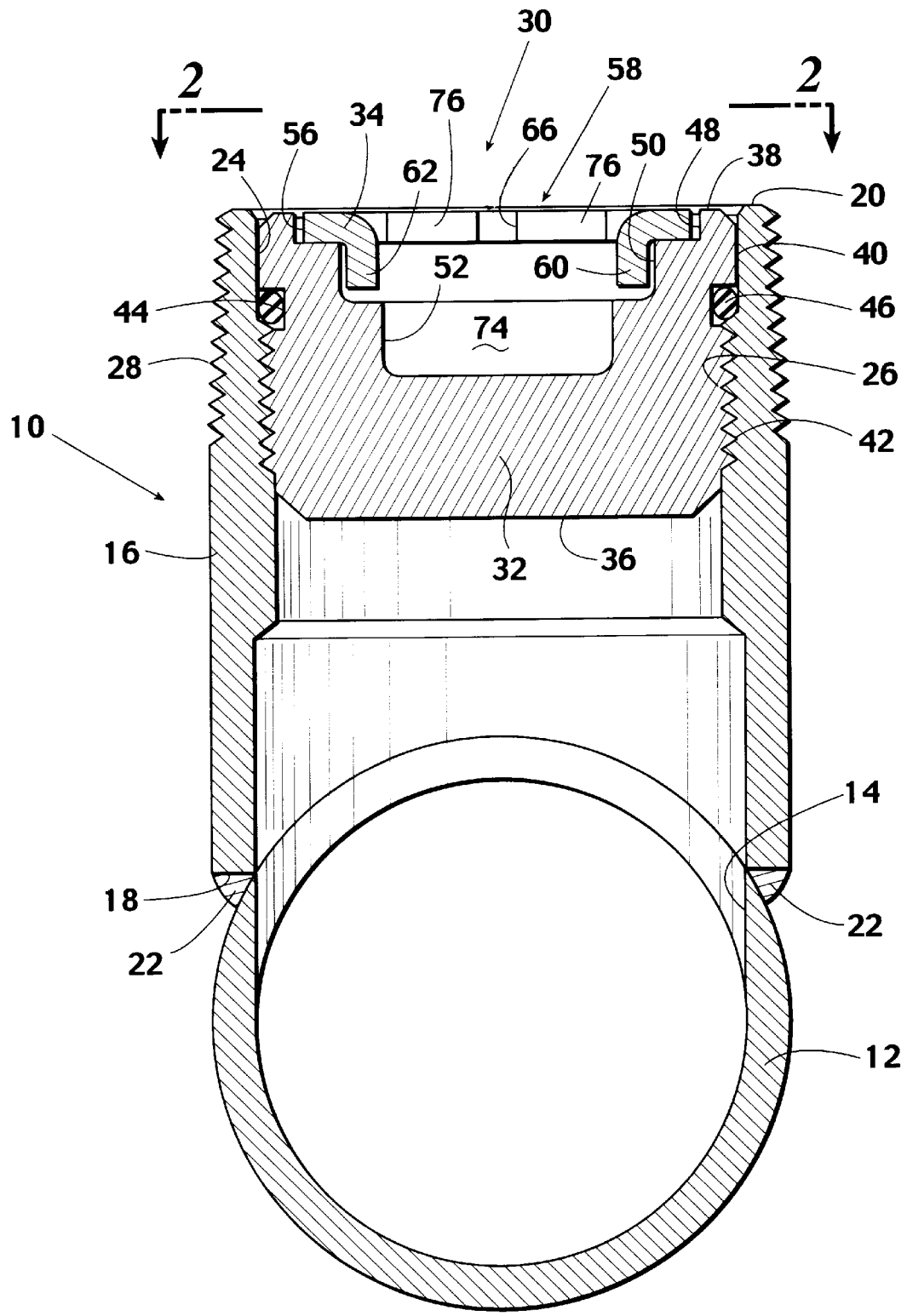
FIG. 1 is an elevational cross-sectional view of a nipple having an inner end that is welded to the external cylindrical surface of a length of pipe, the pipe having an opening therein with which the nipple communicates. Received within the nipple is a plug that is insertable or removable by use of a tool, the plug includes an insert that provides downwardly extending integral tang portions that can be engaged by a tool to rotate the plug either for securing it within the nipple or for removing it from the nipple.

FIG. 1 is an elevational cross-sectional view of the major portions of a system for closing an opening in a sidewall of a pipe, the system being indicated generally by the numeral 10. A length of pipe 12 is shown in cross-section and has an opening 14 therein. Secured to the external surface of the sidewall of pipe 12 is a short length tubular nipple 16 having an inner end 18 and an outer end 20. Inner end 18 is welded to the external surface of pipe 12 to surround opening 14. This is by way of example only as nipple 16 could be secured such as to a threaded fitting or by other means attached to pipe 12 or the nipple 16 may be an integral part of any type of tubular system for conducting liquids or gases. Nipple 16 has, adjacent the outer end 20, an internal cylindrical surface 24 and, farther spaced from end 20, internal threads 26. Lastly the nipple 16 has, adjacent outer end 20, external threads 28.

Positioned within the outer end portion of nipple 16 is a removable plug generally indicated by the number 30. Plug 30 is formed of two basic portions, that is, a plug body 32 and an insert 34.

Plug body 32 is a short length cylindrical member having an inner end 36 and an outer end 38. Plug body 32 has an external cylindrical surface 40 and adjacent to inner end 36, external threads 42. Between the external cylindrical surface 40 and threads 42 is a circumferential groove 44 that receives an elastomeric seal that, in the illustrated arrangement, is in the form of an O-ring 46.

Plug body 32 has a recess in the outer end 38. The recess including a first enlarged diameter portion 48, an intermediate internal diameter portion providing a cylinder sidewall 50 and an inward smallest internal diameter portion 52.

Insert 34 is best illustrated in FIGS. 2 through 5. Insert 34 is preferably formed from a flat plate of metal, such as steel, and includes an external circular surface 56 and a central opening 58. The central opening includes a first and second integral tang portion 60 and 62. When opening 58 is formed in the insert, tang portions 60 and 62 extend in a flat plane of the other portions of the insert, and after the opening is formed, the tang portions are bent downwardly to extend at an angle of about 90° to insert top surface 64. Opening 58 is further defined by two opposed notches 66 and 68 that are rotationally positioned 90° to the tang portions 60 and 62. Insert 34 further has welding notches formed therein. In the illustrated arrangement four such welding notches 70A through 70D are formed in external cylindrical surface 56.

Figure 2:
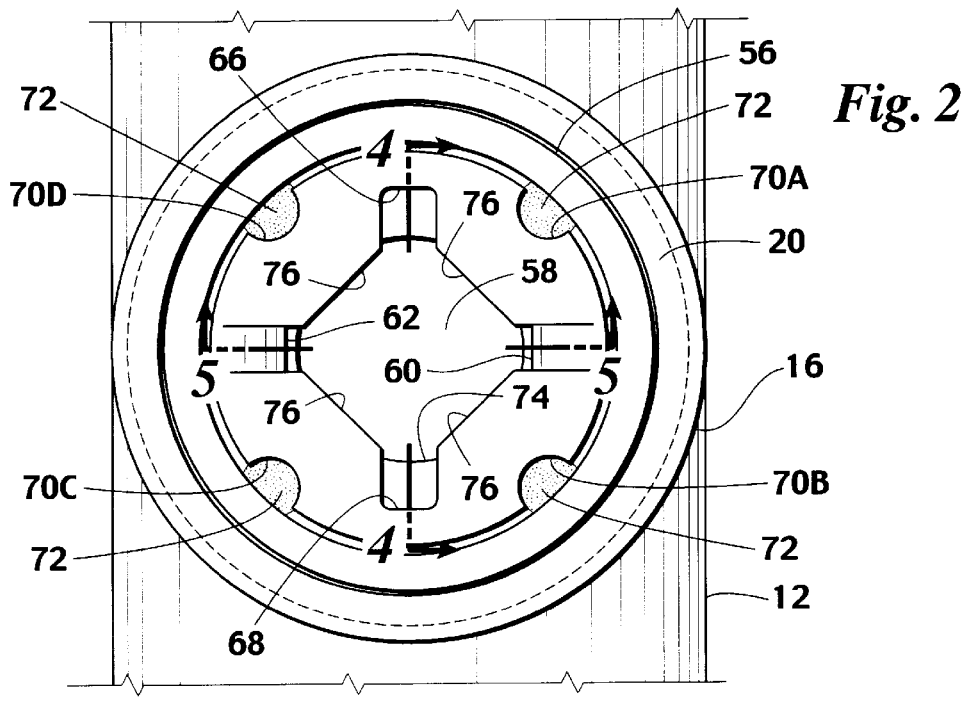
FIG. 2 is a top plan view of FIG. 1 showing the outer end of the nipple and a top view of the plug.
Figure 3:
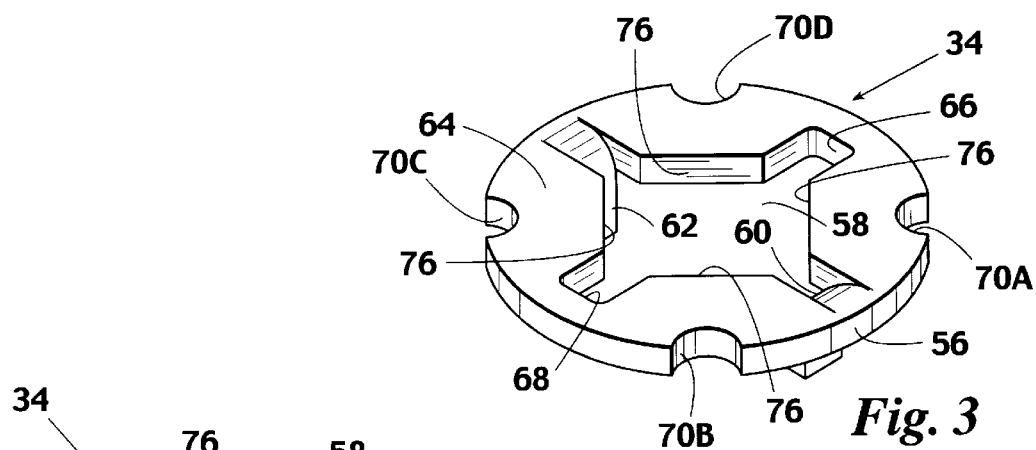
FIG. 3 is an isometric view of the insert that is part of the plug as shown in FIGS. 1 and 2.
Figure 4:
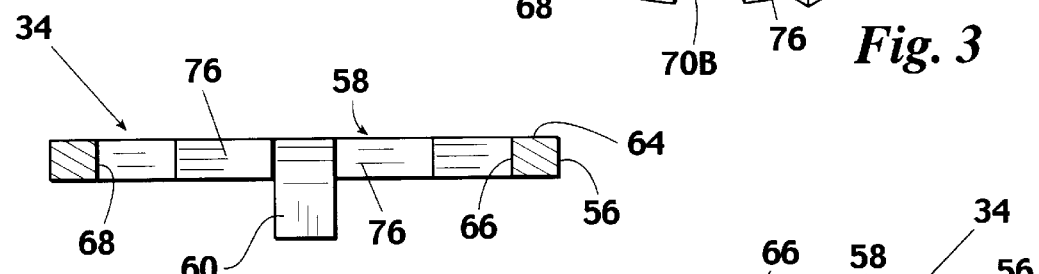
FIG. 4 is a cross-sectional view of the insert as taken along the line 4—4 of FIG. 2.
Figure 5:
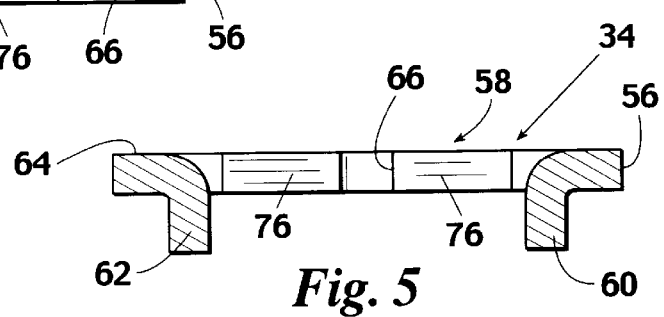
FIG. 5 is another cross-sectional view of the insert as taken along the line 5—5 of FIG. 2.

Insert 34 is secured to plug body 32 by positioning it within the large diameter recess having cylinder sidewall 48 of the plug body, adjacent the plug body top end 38. The insert is then welded to the plug body. Welding is indicated by the numeral 72 in each of welding notches 70A through 70D as shown in FIG. 2. After insert 34 is welded to plug body 32 the plug body and insert become essentially a single member.

The portion of the recess formed in the plug body below insert 34 forms a working space 74.

The opening 58 of insert 34, as seen in all of FIGS. 1 through 5, is shaped so that it can be engaged by a driver tool to rotate the plug. In the illustrated and a preferred embodiment the circumferential shape of opening 58 is defined by four side surfaces 76, oriented 90° with respect to each other to form an essentially square opening. The use of four side surfaces 76 is by way of illustration, however, it is the preferred geometrical arrangement of opening 58 although the opening could be hexagonal, octagonal and so forth. Using four side surfaces 76 rather than three, five, six, eight, etc. facilitates the provision of notches 66 and integral tangs 60 and 62.

The removable plug 30 is intended to be installed in or removed from an internally threaded member, such as nipple 16, by means of a specially constructed driver. A known and commonly used type of driver tool (not illustrated) typically has a cylindrical rod portion of external diameter less than plug recess portion 52 and, adjacent the end of the cylindrical rod portion a pin that extends therethrough, the pin having a length that is less than the space between the outer ends of insert notches 66 and 68. The tool is therefore insertable into the plug by passing the pin through notches 66 and 68 so that the inner end of the tool and the pin is within working space 74. Thereafter, the tool may be rotated so that the pin engages tang portions 60 and 62 to thereby rotate the plug body 32 either to thread it into position within nipple 16, or other internally threaded device, or to unthread it. This known type of tool can be used to place the plug into position to thread it into the nipple, or, if the plug is unthreaded, to carry the plug away from the nipple without requiring that the plug be manually touched when it is inserted into or removed from the nipple.

In addition to the type of driver tool above described, which is not illustrated herein since it is well known in the art, the removable threaded plug of this invention is useful with a specially designed driver and the combination of the plug and driver constitutes a unique aspect of this disclosure. The new type of driver is illustrated in FIGS. 6 and 7, FIG. 6 being an isometric view of the driver alone and FIG. 7 an elevational view of the driver as shown in operating position in conjunction with removable threaded plug 30 shown in cross-section.

Figure 7:
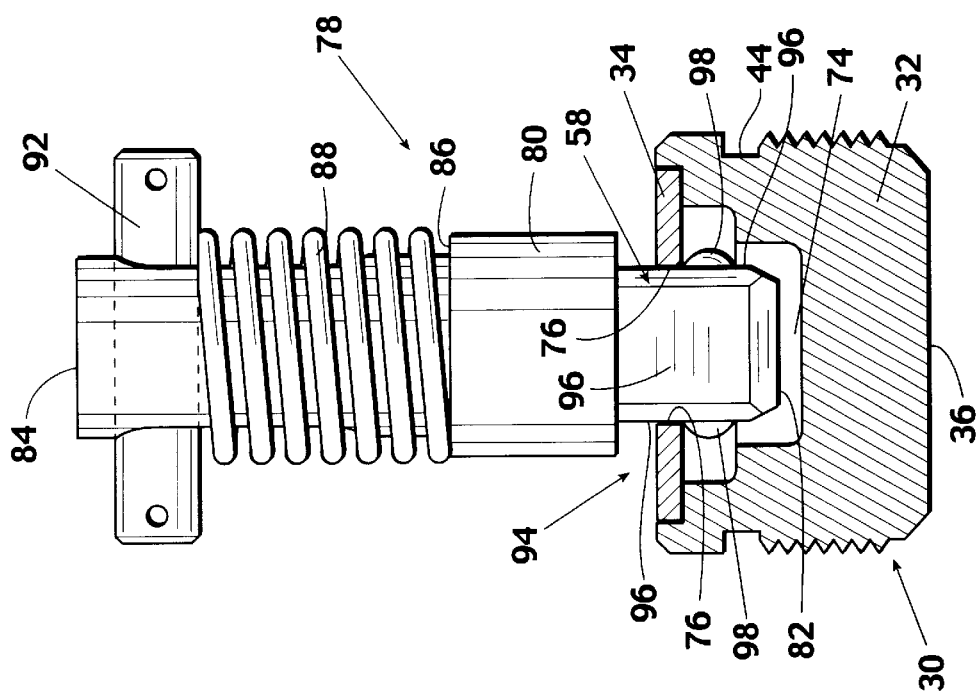
FIG. 7 is an elevational view of the driver of FIG. 6 showing the active end portion of the driver inserted within a plug, the plug being shown in cross-section, as the driver is used to thread or unthread the plug.
Figure 6:
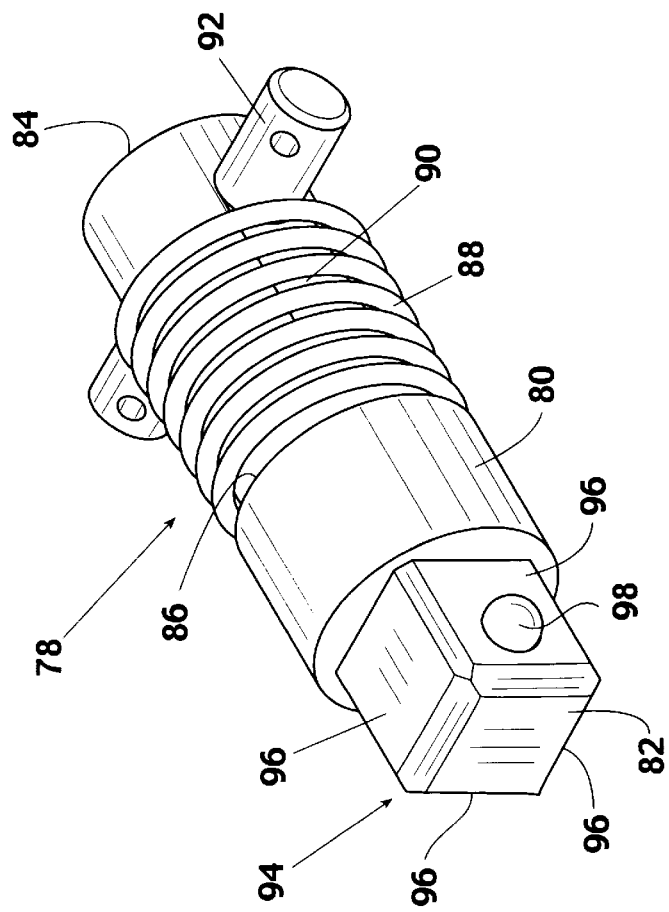
FIG. 6 is an isometric view of a specially designed driver for use in threadably mounting the plug in an opening or for removing the plug.

The new type of drivers is indicated by the numeral 78 in FIGS. 6 and 7 and has an elongated cylindrical body 80 that has an inner end 82 and outer end 84. The intermediate portion of the tool is of a larger diameter than the cylindrical portion adjacent outer end 84 providing a circumferential ledge 86 against which one end of a coil spring 88 contacts. A longitudinal slot 90 is formed in the cylindrical member between ledge 96 and outer end 84. Slot 90 slidably receives a pin 92 that is normally held in its outermost position, towards outer end 84, by spring 90.

At driver inner end 82 an integral plug engaging portion 94 has an external geometrical configuration to be slidably but non-rotatably received within the opening 58 of plug insert 34. The plug engaging portion 94, in the illustrated embodiment, is defined by four sides 96 that form, in cross-section, a square of dimensions so that it is slidably positionable in insert central opening 58. FIG. 7 shows plug engaging portion 94 inserted through opening 58 formed by sides 76. In applications wherein opening 58 in insert 34 is geometrically configured other than a square then the driver plug engaging portion 94 will be similarly cross-sectionally configured but, as previously indicated, a square is deemed to be the best embodiment.

Formed on opposed sides 96 of plug engaging portion 94 are ball detents 98, each of which is forced outwardly by an internal spring (not seen) in the normal manner that ball detents are employed. The detents are compressed inwardly against spring tension as the plug engaging portion 94 of the driver is inserted into plug 30. Detents 98 serve to prevent inadvertent removal of the driver from engagement with plug 30 and also provide a tactile means of letting an operator know when the driver has been properly seated in the plug.

Driver 78 is intended for use with an operating tool (not seen) which typically is an elongated member that has provisions on its outer end for engagement with the driver and specifically for engagement with pin 92 by which the driver is removably secured to the operating tool. The driver itself could be integral with an elongated operating tool thereby eliminating the need for pin 92 and spring 88, however, in the trade the use of an operating tool is normally employed in conjunction with a driver of the type exemplified by tool 78.

Thus, the improved removable threaded plug as described herein is susceptible for use with two completely different types of drivers, that is, first, the commonly known driver in current use (not illustrated herein) having a cylindrical end portion with a pin extending radially therethrough, the pin being insertible into notches 66 and 68 to rotate against tangs 60 and 62, and second, the completely different type of driver illustrated and described with reference to FIGS. 6 and 7. This new type of driver does not make use of tangs 60 and 62 and therefore if plug 30 is designed only for use with the new driver, notches 66 and 68 and tangs 60 and 62 can be eliminated from insert 34.

System 10 of this invention consists of the basic components of a nipple 16 having internally threads 26, a plug body 32 having external threads to be thereby threadable in the nipple, insert 34 that is attached to the plug body and provides provisions for threading and unthreading the plug body, an elastomeric O-ring 46, and a driver 78 as illustrated and described with respect to FIGS. 6 and 7.

The improved removable plug is economically manufactured since it requires only two pieces that are assembled by welding. The insert can be efficiently stamped from a sheet of metal without requiring machining. The internal and external features of the plug body are easily machined. Nipple 16 and driver 78 are, in like manner, easily manufactured without requiring unusual or specialized machining steps.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A removable threaded plug for an internally thread opening, comprising:

a short length cylindrical plug body having a circular recess therein providing a cylindrical sidewall, the plug body having a cylindrical external surface having threads thereon engageable with internal threads of an opening and having a recess in a top surface; and an essentially flat insert positioned in said recess and secured to said plug body providing an operating space within said recess below the insert, the insert having a generally planar upper surface and an external substantially circular peripheral edge and having a central opening therethrough configured to receive a driver, the insert central opening being shaped to provide at least one integral tang portion formed of material removed from the central opening and that is integrally bent to extend downwardly into said operating space which by contact with the insert only said plug body is threadably rotated, the insert being secured at said circular external peripheral edge to said cylindrical plug body.

2. A removable threaded plug according to claim 1 wherein said plug body and said insert are both of metal and said insert is secured to said plug body by welding.

3. A removable threaded plug according to claim 1 wherein said plug body has on said cylindrical external surface a circumferential groove, and including:

a circumferential elastomeric seal member received in said plug body circumferential groove.

4. A removable threaded plug according to claim 1 wherein said insert is in the form of a metal plate and wherein said central opening therethrough is shaped to provide two integral tang portions that are oriented opposite each other, both of the tang portions being formed of material removed from the central opening and being integrally bent to extend downwardly and at least substantially parallel to each other into said operating space.

5. A removable threaded plug according to claim 4 wherein said insert is in the form of a metal plate and wherein said central opening therethrough is shaped to provide in addition to said two integral tang portions oppositely oriented with respect to each other, two radially extending notches oppositely oriented from each other and rotationally spaced relative to said tang portions.

6. A removable threaded plug according to claim 1 wherein said plug body and said insert are both of metal and wherein said insert is in the form of a metal plate having said external substantially circular peripheral edge dimensioned to be received within said plug body recess and said insert having at least one welding notch in said external peripheral edge and wherein said insert is secured to said plug body by welding at said welding notch.

7. A removable threaded plug according to claim 1 wherein said insert central opening is shaped in a geometrical pattern to slidably and non-rotatably receive a plug engaging portion of a driver.

8. A removable threaded plug according to claim 1 wherein said insert central opening has sidewalls defining a square geometrical pattern configured to slidably and non-rotatably receive a driver plug engaging portion of matching square cross-sectional configuration.

9. A system for closing an opening in the sidewall of a pipe comprising:
   a nipple having an inner end and an outer end, the inner end being configured to be sealably attached to and encompass the opening and having internal threads adjacent said outer end;
   a short length cylindrical plug body having a cylindrical external surface having threads thereon, the plug body being threadably received within said nipple outer end, the plug body having a circular recess in a top surface providing a cylindrical sidewall; and
   an essentially flat insert positioned in said recess and secured to said plug body providing an operating space within said recess below the insert, the insert having a generally planar upper surface and an external substantially circular peripheral edge and having a central opening therethrough configured to receive a driver, the insert central opening being shaped to provide at least one integral tang portion formed of material removed from the central opening and that is integrally bent to extend downwardly into said operating space, the insert being secured at said circular external peripheral edge to said cylindrical plug body.

10. A system for closing an opening according to claim 9 wherein said nipple has an internal cylindrical surface between said internal threads and said outer end and wherein said plug body has on said cylindrical external surface a circumferential groove, and including:
   a circumferential elastomeric seal member received in said plug body circumferential groove and in sealed engagement with said nipple internal cylindrical surface.

11. A system for closing an opening according to claim 9 wherein said nipple has, adjacent said outer end, external threads.

12. A system for closing an opening according to claim 9 wherein said insert central opening therethrough is shaped to provide at least one integral tang portion that is bent to extend downwardly into said operating space.

13. A system for closing an opening according to claim 9 wherein said plug body and said insert are both of metal and said insert is secured to said plug body by welding.

14. A system for closing an opening according to claim 9 wherein said insert is in the form of a metal plate and wherein said tool receiving central opening therethrough is shaped to provide two integral tang portions that are oriented opposite each other, both of the tang portions being bent to extend downwardly and at least substantially parallel to each other into said operating space.

15. A system for closing an opening in the sidewall of a pipe according to claim 14 wherein said insert is in the form of a metal plate and wherein said tool receiving central opening therethrough is shaped to provide, in addition to said two integral tang portions oppositely oriented with respect to each other, two radially extending notches oppositely oriented from each other and rotationally spaced relative to said tang portions.

16. A system for closing an opening according to claim 9 wherein said plug body and said insert are both of metal and wherein said insert is in the form of a metal plate having said external substantially circular peripheral edge dimensioned to be received within said plug body recess and said insert having at least one welding notch in said external peripheral edge and wherein said insert is secured to said plug body by welding at said welding notch.

17. A system for closing an opening according to claim 9 wherein said insert central opening is shaped in a geometrical pattern to slidably and non-rotatably receive a plug engaging portion of a driver.

18. A system for closing an opening according to claim 17 wherein said insert central opening has sidewalls defining a square geometrical pattern configured to slidably and non-rotatably receive a driver plug engaging portion of matching square cross-sectional configuration.

19. A removable threaded plug for an internally thread opening, comprising:
   a short length cylindrical plug body having a circular recess therein providing a cylindrical sidewall, the plug body having a cylindrical external surface having threads thereon engageable with internal threads of an opening; and
   an essentially flat insert positioned in said recess and secured to said plug body providing an operating space within said recess below the insert, the insert having a generally planar upper surface and an external substantially circular peripheral edge and having a central opening therethrough configured to receive a driver, which by contact with the insert only said plug body is threadably rotated, wherein said plug body and said insert are both of metal and wherein said insert is the form of a metal plate having said external substantially circular peripheral edge dimensioned to be received within said plug body recess and said insert having at least one welding notch in said external peripheral edge and wherein said insert is secured to said plug body by welding at said welding notch.

20. A system for closing an opening comprising:
   a nipple having an inner end and an outer end, the inner end being configured to be sealably attached to and encompass the opening and having internal threads adjacent said outer end;
   a short length cylindrical plug body having a cylindrical external surface having threads thereon, the plug body being threadably received within said nipple outer end, the plug body having a circular recess in a top surface providing a cylindrical sidewall; and
   an essentially flat insert positioned in said recess and secured to said plug body providing an operating space within said recess below the insert, the insert having a generally planar upper surface and a substantially circular peripheral edge and having a tool receiving central opening therethrough configured to receive a driver which by contact with the inert only said plug body is threadable rotated, wherein said plug body and said insert are both of metal and wherein said insert is in the form of a metal plate having said external substantially circular peripheral edge dimensioned to be received within said plug body recess and said insert having at least one welding notch in said external peripheral edge and wherein said insert is secured to said plug body by welding at said welding notch.

* * * * *